3,623,832
PROCESS FOR THE DYEING AND PRINTING OF POLYAMIDE AND POLYURETHANE TEXTILE FIBRES WITH MIXTURES OF NITRODIPHENYL-AMINO DYESTUFFS
Daniel van Assche, Binningen, Basel-Land, and Josef Frauenknecht, Therwil, Basel-Land, Switzerland, assignors to Sandoz Ltd., Basel, Switzerland
No Drawing. Filed July 9, 1970, Ser. No. 53,679
Claims priority, application Switzerland, July 18, 1969, 11,033/69
Int. Cl. D06p 3/24
U.S. Cl. 8—25        36 Claims

ABSTRACT OF THE DISCLOSURE

A process for the dyeing and printing of natural polyamide fibres and synthetic polyamide and polyurethane fibres using a mixture of two dyes of the nitrodiphenylamino series, each of which contains a single sulphonic acid group plus a sulphonamide group which may be unsubstituted or substituted by an alicyclic, aromatic or heterocyclic radical.

---

For dyeing textiles made of synthetic polyamides (polyamide 6, 66, 610, 11, 6.66), dyes with powerful migration have to be used to balance physical differences in the substrate. All the components of a dye combination must show balanced migration behaviour to prevent dichroism and barriness.

Although there are a great many acid dyes suitable for dyeing synthetic polyamide fibres, only a relatively small number behave satisfactorily in combination and at the same time show good migration, good pH dependence and temperature dependence.

It has now been found that natural polyamide fibres and synthetic polyamide and polyurethane fibres can be dyed and printed in fast, level shades using a mixture of two dyes of the nitrodiphenylamino series, each of which contains a single sulphonic acid group plus a sulphonamide group which may be unsubstituted or substituted by an alicyclic, aromatic or heterocyclic radical.

The present invention thus relates to a process for the dyeing and printing of textiles made of natural polyamide fibers, synthetic polyamide fibres or polyurethane fibres, which comprises the use of a mixture of 10% to 90% of an acid dye of the formula

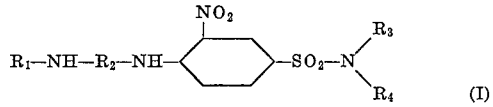
(I)

and 90% to 10% of a second acid dye of the formula

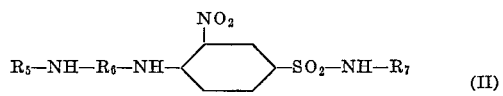
(II)

where $R_1$, $R_2$, $R_5$ and $R_6$ stand for the same or different aromatic radicals which may be substituted, $R_3$ for hydrogen or a lower alkyl radical which may be substituted, $R_4$ for hydrogen or an alkyl radical which may be substituted, the total number of carbon atoms in the substituents $R_3$ and $R_4$, provided both represent alkyl radicals, being not greater than 4, and where $R_7$ stands for an alicyclic, aromatic or heterocyclic radical which may be substituted and both dye (I) and dye (II) bears one sulphonic acid group.

Alternatively, the textiles can be dyed or printed with a mixture of more than one dye of Formula I and one dye of Formula II, or with a mixture of more than one dye of Formula II and one dye of Formula I.

Good dyeings are obtained with a mixture of 30% to 70% or 40–60% or, preferably, 50% of one dye of Formula I and 70% to 30% or 60–40% of, preferably, 50% of one dye of Formula II.

Wool, silk and hair fibres are among the natural polyamides which are suitable for dyeing and printing by this process. The suitable polyurethane fibres include the condensation products of aliphatic $\alpha,\omega$-diols and aliphatic or aromatic di-iso-cyanates, e.g. the condensation products of 1,4-butanediol and hexamethylene di-iso-cyanate or of polytetramethylene ether glycol, toluylene di-iso-cyanate and diphenylmethane di-iso-cyanate. Synthetic polyamide fibres, e.g. the polyamides 6, 66, 610, 11 and 6.66, can be dyed and printed with the aforestated dye mixtures with notably good results. The principal synthetic polyamides are the polycondensation products of dibasic organic acids, e.g. adipic or sebacic acid and hexamethylene diamine, or of $\omega$-aminoundecylic acid or poly-$\epsilon$-caprolactam.

The polyamides and polyurethanes can be dyed in the form of loose fibre, as yarns, woven fabric, knitted goods, or as other flat products, for example as tufted carpets or as cast film or sheet.

The radicals $R_1$, $R_2$, $R_5$ and $R_6$ in the dyes of Formulae I and II are preferably mononuclear aromatic radicals, e.g. benzene nuclei, which may be substituted by methyl, ethyl, methoxy, ethoxy, chlorine, bromine, acylamino, such as acetylamino or propionylamino, or in particular by a sulphonic acid group.

The radical

may be the —$NH_2$-group or —NH-lower alkyl e.g. —NH—$CH_3$, —NH—$C_2H_5$, —NH—$C_3H_7$n, —NH—$C_3H_7$-iso, —NH—$C_4H_9$n, —NH—$C_4H_9$-iso or —N(lower alkyl)$_2$. If the radical has one of these meanings, it is desirable for the two alkyl groups to contain together not more than 4 carbon atoms; examples are

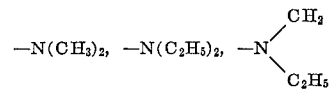

—NH-lower hydroxyalkyl, e.g. —NH—$C_2H_4$—OH,

—NH—$CH_2CHOH$—$CH_3$

—NH—$CH_2$—$CH_2$—$CH_2$—OH; —N(lower hydroxalkyl)$_2$, e.g. —N($C_2H_4$—OH)$_2$; —NH-lower alkoxyalkyl (—NH—$C_2H_4$—$OCH_3$, —NH—$C_2H_4$—O—$C_2H_5$,

—NH—$CH_2$—$CH_2$—$CH_2$—O—$CH_3$)

—NH—$C_2H_4$—NH-alkanoyl, e.g.

—NH—$C_2H_4$—NH—CO—$CH_3$

—NH—$C_2H_4$—NH—CO —$C_2H_5$. The preferred radicals however are —$NH_2$, —NH—$CH_3$ and —NH—$C_2H_5$, or in general terms —NH-lower alkyl.

The lower alkyl radicals contain preferably 1, 2, 3 or 4 carbon atoms. The radical $R_7$ may be heterocyclic but is preferably aromatic or alicyclic, e.g. phenyl, 2-, 3- or 4-methylphenyl, 2- or 4-methoxyphenyl or -ethoxyphenyl, 2-methoxy-5-methylphenyl, 2-, 3- or 4-chlorophenyl, 2- or 4-acetylaminophenyl or -propionylaminophenyl, cyclohexyl, 4 - methylcyclohexyl, 3,5,5 - trimethylcyclohexyl, naphthyl-1, naphthyl-2; 5,6,7,8-tetrahydronaphthyl-1. Of these, the mononuclear radicals are preferred, in particular a phenyl or a cyclohexyl radical.

Good dyeings are obtained when dye mixtures are employed containing dyes of the formulae

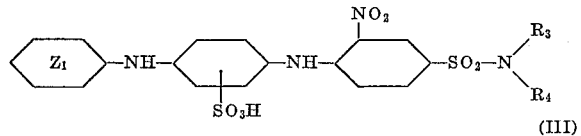

(III)

or

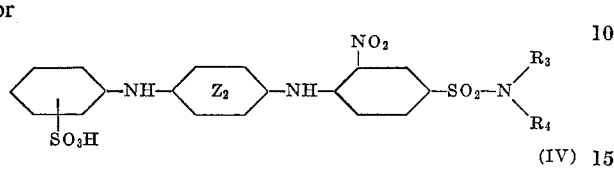

(IV)

where both of the aromatic rings $Z_1$ and $Z_2$ may be unsubstituted or substituted by methyl, ethyl, methoxy, ethoxy, chlorine, bromine or acylamino.

Equally good dyeings are obtained with mixtures containing dyes of the formulae

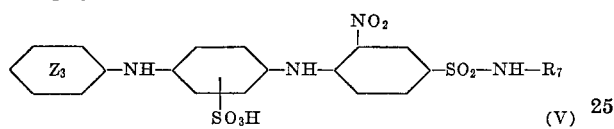

(V)

or

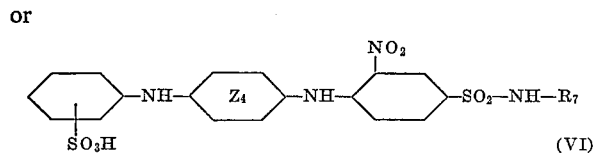

(VI)

where the aromatic rings $Z_3$ and $Z_4$ may be unsubstituted or substituted by methyl, ethyl, methoxy, ethoxy, chlorine, bromine or acylamino.

Examples of dyes of Formula I are:

| | Dye No. |
|---|---|
| $A_1-SO_2-NH_2$ | ① |
| $A_2-SO_2-NH_2$ | ② |
| $A_3-SO_2-NH_2$ | ③ |
| $A_1-SO_2-NH-CH_3$ | ④ |
| $A_1-SO_2-N(CH_3)_2$ | ⑤ |
| $A_1-SO_2-N(C_2H_5)_2$ | ⑥ |
| $A_1-SO_2-NH-C_2H_4-OH$ | ⑦ |
| $A_1-SO_2-NH-C_2H_4-NH-CO-CH_3$ | ⑧ |
| $A_1-SO_2-NH-CH_2-CH_2-CH_2-O-CH_3$ | ⑨ | where $A_1$ represents the radical of the formula

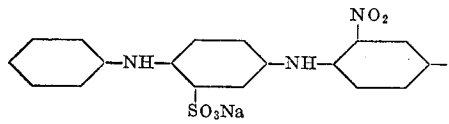

$A_2$ is the radical of the formula

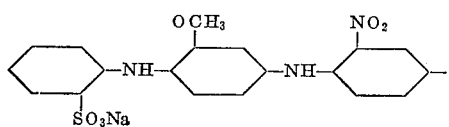

and $A_3$ is the radical of the formula

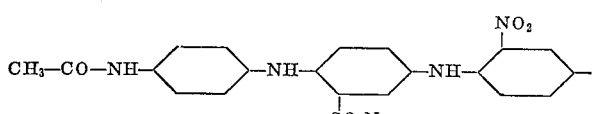

Examples of dyes of Formula II are:

| | Dye No. |
|---|---|
| $A_1-SO_2-NH-\langle\rangle$ | ⑩ |
| $A_1-SO_2-NH-\langle H \rangle$ | ⑪ |
| $A_2-SO_2-NH-\langle\rangle$ | ⑫ |
| $A_1-SO_2-NH-\langle Cl \rangle$ | ⑬ |
| $A_1-SO_2-NH-\langle OCH_3 \rangle$ | ⑭ |
| $A_1-SO_2-NH-\langle OCH_3, CH_3 \rangle$ | ⑮ |
| $A_1-SO_2-NH-\langle CH_3, H, CH_3, CH_3 \rangle$ | ⑯ |
| $A_1-SO_2-NH-\langle\langle\rangle\rangle$ | ⑰ |
| $A_1-SO_2-NH-\langle\langle H \rangle\rangle$ | ⑱ | where $A_1$ has the meaning given in the foregoing.

In addition to the dyes of Formulae I and II, other acid dyes can be employed; the following are especially suitable:

Example A: 1-(2'-N-ethyl - N - phenylaminosulphonyl-phenylazo)-2-amino-8-hydroxynaphthalene-6-sulphonic acid as the sodium salt (bluish red)

Example B: 1-(2',4'-dinitrophenylamino)-4-phenylamino-benzene-2-sulphonic acid as the sodium salt (yellowish brown)

Example C: 1-amino-4-(4'-methyl-3'-acetylaminophenylamino)-anthraquinone-2-sulphonic acid as the sodium salt (blue)

Example D: 1-amino-4-(4'-N-methyl-N - acetylaminophenylamino)-anthraquinone-2-sulphonic acid as the sodium salt (blue)

Example E: 1-amino-4-(4' - acetylaminophenylamino)-anthraquinone-2-sulphonic acid as the sodium salt (blue).

Dyeings and prints of notably good quality are obtained with these dyes.

Polyamide and polyurethane fibres can be continuously or discontinuously dyed with these dyes, preferably from aqueous medium, at a goods to liquor ratio of 1:0.5 to 1:100, or more especially 1:0.5 to 1:4, in padding processes and 1:2 to 1:100, preferably 1:5 to 1:60 or more especially 1:10 to 1:40, in exhaust dyeing processes.

In addition to dyes of Formulae I and II and one or more other acid dyes, e.g. those named in Examples A to E, the dyebaths for exhaustion dyeing may contain assistants, for example anionic assistants substantive to the fibre (alkyl sulphates, aralkyl sulphonates, sulphonated oils), in amounts of up to about 3%, e.g. 0.7–2%, on the weight of the goods; cationic or non-ionic assistants substantive to the dyes (polyoxethylated fat alkylamines and fat alkylpolyamines which may be quaternated, polyoxethylated condensation products, which may likewise be quaternated, of a higher fatty acid with 12–22 carbon atoms, such as stearic or oleic acid, with ammonia, a primary amine or a polyamine, polyoxethylated fatty acids, fatty alcohols, alkylmercaptans, alkylphenols, dialkylphenols, alkylnaphthols or dialkylnaphthols) in amounts of up to 4%, preferably 0.7% to 2%, on the weight of the goods; neutral salts, such as sodium chloride or sulphate, in amounts of up to 20% but preferably not greater than 10–15% on the weight of the goods; acid donors, such as weakly acid to acid buffer mixtures, e.g. acetic acid and sodium acetate, monophosphate and diphosphate; acid salts, such as sodium hydrogen sulphate and ammonium sulphate; and acids, such as acetic, formic and sulphuric acid; the amount of the buffer mixture being up to 6%, that of the acids or acids salts up to 4%, preferably 1–3%, on the weight of the goods.

The dyebath is adjusted to a pH value in the region of about 3 to 9. Good dyeings on natural polyamides are obtained at a bath pH of 3 to 7, while synthetic polyamide fibres are dyed preferably at a pH value of 4 to 8.

The goods are entered into the bath at room temperature, i.e. 15–20° C. to 80–90° C., preferably at a temperature in the range of 20–60° C. The bath is raised to the dyeing temperature in about 15 to 60 minutes and the goods dyed for about 15 minutes to 2–3 hours.

The dyeing temperatures range from 60° C. to 140° C., e.g. 60–107° C. for wool and 60–140° C., or preferably 95–130° C., for synthetic polyamide and polyurethane fibres. Pressure dyeing machines are preferably employed for dyeing at temperatures above 100° C. For dyeing at temperatures of about 90° C. or below, it is advisable to set the bath with an alcohol moderately soluble in water, e.g. n-butanol, n-amyl alcohol, n-hexanol or benzyl alcohol, in amounts of up to 80 g./l. (butanol) or 10 g./l. (hexanol), or with a urea or carbamic acid ester derivatives, e.g. n-octylurea, 2-ethylhexyloxypropyl-urea, cyclohexyl urea, 4-n-butylphenyl urea, N-n-octyl-carbamic acid-($\beta$-hydroxyethyl)-ester, or the monoalkylamides of dicarboxylic acids, such as n-octyl—NH—OC—CH=CH—COOH, 2-ethylhexyl—O—CH$_2$—CH$_2$—CH$_2$—NH—OC—CH=CH—COOH or the condensation products of acrylic acid amide or chloracetic acid amide with alcohols, alkyl polyglycol ethers or alkyl phenylpolyglycolethers, such as n-octyl—O—CH$_2$—CH$_2$—CONH$_2$ n - C$_{12}$H$_{25}$—(O—C$_2$H$_4$)—O—CH$_2$—CH$_2$—CO—NH$_2$, tridecyl—(OC$_2$H$_4$)$_2$—O—CH$_2$—CH$_2$—CO—NH. These nitrogenous assistants are used in amounts of 0.5 to 5 parts, preferably 0.7 to 2 parts, per 1000 parts of the dyebath. After dyeing, the goods are removed from the bath, rinsed with water and dried.

For pad application it is advisable to employ padding liquors containing an acid stable thickening agent, such as carubine (locust bean) or guarana (guarana seed) paste or one of their derivatives, or an ether derivative in amounts of up to 10 grams per litre of the padding liquor. Level and fast deyings of good depth are obtained when a coacervating agent is included in the liquor, e.g. fatty acid-diethanol amides, ethylene oxide adducts having preferably 12–14 carbon atoms in the fatty acid radical or with a turbidity point below room temperature in the padding liquor, e.g. lauryl-tetra- and lauryl-penta-glycol ethers, octylphenyl- and nonylphenyltetra- and penta-glycolethers, oleylpenta- and hexa-glycol ethers, if desired in conjunction with anionic assistants, such as alkylbenzene sulphonates (sodium dodecylbenzeneesulphonate), alkyl sulphates (sodium lauryl, cetyl and oleyl sulphates, sodium tridecyl-2-sulphate), alkylpolyglycol- and alkylphenylpolyglycolether sulphates (sodium lauryl diglycol, tridecyl triglycol, octylphenyltetraglycolether sulphate). The coacervating agent is used in optimum amounts of 10 to 60 parts, or more especially 15 to 40 parts, per 1000 parts of the padding liquor. If an anionic assistant is used, equal or approximately equal amounts of the two products can be employed, e.g. 10 parts of the coacervating agent and 5 to 15 parts of the anionic assistant. The aforenamed compounds and mixtures are suitable as acid donors.

The padding liquor is best adjusted to a pH value of about 7 to 4. Padding is carried out at room temperature or at slightly higher temperatures, e.g. 15–60° C., and the goods are expressed to retain 50% to 400% of their weight of liquor. They may be dried intermediately, according to the process used, after which the dyeing is fixed, either by steaming at 98–102° C. for 1–20 minutes or at 102–130° C. in superheated steam, with or without excess pressure, for 10 seconds to about 5 minutes.

Another known fixation method is treatment in a hot acid bath, the pH of which may be 7 to 3. It is best to enter the padded goods into this bath at 80–98° C. The goods to liquor ratio varies from 1:1 to 1:100, being preferably 1:5 to 1:30, and the treatment times are from 1 to 10 minutes. Particularly good results have been obtained by submitting the fabric to a short steam treatment for partial fixation of the dyeing and then conveying it into the hot acid bath to complete fixation. The bath may be set with an inorganic or organic acid or with an acid salt, e.g. sulphuric, phosphoric, hydrochloric, formic or acetic acid, sodium or potassium hydrogen sulphate or ammonium chloride. Organic acids, notably formic acid, are preferred. Often it is beneficial to include a water-soluble salt, preferably a calcium salt, in the acid bath.

After fixation of the dyeing, the goods are washed off, rinsed and dried in the normal way.

Yarns, woven and knitted fabrics, tufted carpets and cast goods are printed with pastes containing, besides dyes of Formulae I and II and possibly other acid dyes, a thickening agent as named above for pad application, or a gum, such as crystal gum. This is employed in amounts that give the paste the desired viscosity, e.g. 1 to 100 parts of thiourea or 50 to 500 parts of a 33% crystal gum thickening per 1000 parts of printing paste. As acid donor 1 to 35 parts, preferably 3 to 15 parts, of an ammonium salt, such as ammonium tartrate, per 1000 parts of the printing paste are used. Solvents, preferably polyols or polyolethers, such as mono-, di- or tri-ethylene glycol, mono-, di- or tri-propylene glycol, the methyl, ethyl, n-propyl, isopropyl or n-butyl ethers of mono-, di- or tri-ethylene glycol or -propylene glycol, thiodiethylene glycol, glycerine or sorbital, may be employed in amounts of up to 100 parts per 1000 parts of the printing paste.

The pastes are applied by roller or screen printing methods. After intermediate drying the print is fixed, for example by steaming as given for pad dyeing, and finished. Intermediate drying can be omitted if desired.

The dyeings and prints obtained on wool, synthetic polyamide and polyurethane fibres are level and have good fastness to light, washing, milling, water sea water, perspiration, rubbing and dry cleaning. Barry dyeing synthetic polyamide fibres are covered.

A number of the dyes of Formulae I and II are known, including those of the formula

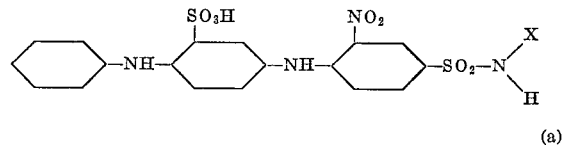

(a)

where X represents hydrogen or a phenyl radical, which are described in German Pat. 709,692.

It is surprising that a mixture of dyes of Formulae I and II show better migration and levelling properties than a single dye of Formula (a), together with better shade solidity on blend fabrics of wool and synthetic polyamide fibre and better suitability for combination with other acid dyes, notably with those of Examples A to E.

The dyes of Formula I can be produced in accordance with U.S. Pat. 2,080,704, for example by condensation of aminodiphenylamines with the corresponding ortho-halogenonitrophenyl compounds.

Mixtures of dyes of Formula I and II can be converted into stable, liquid dye preparations, if necessary with the assistance of a stabilizer. Alternatively, they can be converted into stable solid granules by drying in an atomizer drier, if necessary with the prior addition of a standardizing agent, such as sodium sulphate.

In the following examples the parts and percentages are by weight and the temperatures in degrees centigrade.

EXAMPLE 1

100 parts of a polyamide 6.6 filament fabric are entered at 40° into a dyebath consisting of 4000 parts of water, 0.5 part of dye No. ①, 0.5 part of dye No. ⑩ and 2 parts of 100% acetic acid. The bath is raised to 100° in 30 minutes and held at this temperature for 30 minutes. The water lost by evaporation is replaced, 2 parts of 100% acetic acid are added and dyeing is continued for 30 minutes at the boil. The fabric is then removed, rinsed with warm and cold water, and dried. A perfectly level dyeing, which is fast to light and wet treatments, of yellowish brown shade is obtained.

This method can be employed to dye wool and other natural polyamides with comparable levelness and fastness. On synthetic polyamide fibres other than polyamide 6.6 similarly good results are obtained.

Dye No. ① can be replaced by one of the dyes Nos. ② to ⑨ or by a mixture of these. Similarly, dye No. ⑩ can be replaced by one of the dyes Nos. ⑪ to ⑱ or by a mixture of these.

If desired 1 to 2 parts of a highly sulphonated castor oil can be added to the dyebath, for example in dyeing with mixtures of dyes Nos. ⑨ and ⑰ or dyes Nos. ⑨ and ⑱.

EXAMPLE 2

A padding liquor is prepared with 100 parts of water, 2 parts of dye No. ①, 2 parts of dye No. ⑩, 3 parts of locust bean gum, 3 parts of nonylphenyl pentaglycol ether, 2 parts of sodium lauryl diglycolether sulphate and sufficient monosodium phosphate for a pH of 6. A polyamide 6.6 filament fabric is padded with the liquor at 50°, expressed to retain 100% of its weight of liquor, dried at 120° and fixed by treatment in saturated steam for 20 minutes at 100°. It is then rinsed with hot and cold water and dried. A level yellowish brown dyeing is obtained which has good light and wet fastness properties.

EXAMPLE 3

A polyamide 6.6 filament fabric is printed with a paste of the following composition:

| | Parts |
|---|---|
| Dye No. ① | 2.5 |
| Dye No. ⑩ | 2.5 |
| Bis - (β-hydroxyethyl)-sulphide | 25 |
| 2 - (2'-n-butoxyethoxy)-ethanol | 25 |
| Thiourea | 50 |
| 33% crystal gum thickening | 500 |
| Ammonium tartrate | 7 |
| Water | 388 |
| | 1000 |

The print is dried, steamed for 20 minutes at 100–102°, rinsed and dried. The level yellowish brown print thus produced in light and wet fast.

EXAMPLE 4

A fabric as used in Example 1 is dyed by the procedure of that example using 0.4 part of dye ① in place of 0.5 part and 0.6 part of dye ⑩ in place of 0.5 part. A level yellowish brown dyeing of comparably good quality is obtained.

EXAMPLE 5

Using the procedure of Example 1, with 0.3 part of dye ② instead of 0.5 part of dye ① and 0.7 part of dye ⑫ instead of 0.5 part of dye ⑩, an equally good dyeing of yellowish brown shade is obtained on synthetic polyamide fabric.

EXAMPLE 6

On replacing the 0.5 part of dye ① specified in Example 1 by 0.6 part of dye ④ and the 0.5 part of dye ⑩ by 0.4 part of dye ⑬ and dyeing by the method of that example, a comparably good dyeing of yellowish brown shade is obtained on synthetic polyamide fabric.

EXAMPLE 7

Replacement of the 0.5 part of dye ① used in Example 1 by 0.7 part of dye ⑦ and the 0.5 part of dye ⑩ by 0.3 part of dye ⑰ gives an equally good, level yellowish brown dyeing on synthetic polyamide fabric.

Formulae of representative dyes of the foregoing examples are as follows:

EXAMPLE 1

0.5 part of the dye of the formula

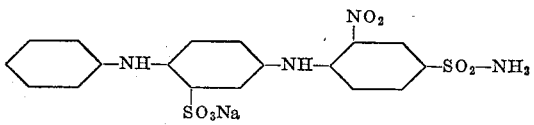

and 0.5 part of the dye of the formula

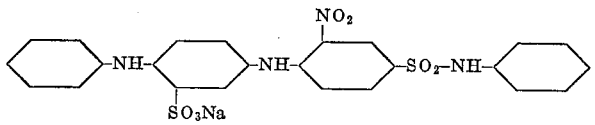

EXAMPLE 4

0.4 part of the dye of the formula

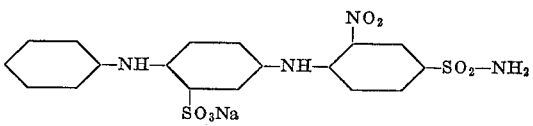

and 0.6 part of the dye of the formula

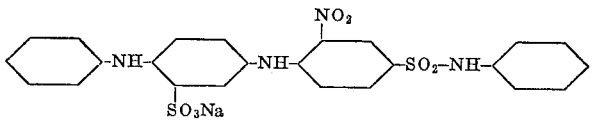

EXAMPLE 5

0.3 part of the dye of the formula

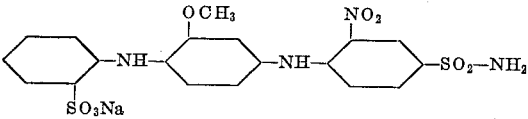

and 0.7 part of the dye of the formula

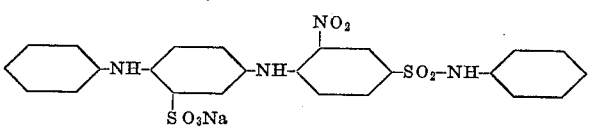

EXAMPLE 6

0.6 part of the dye of the formula

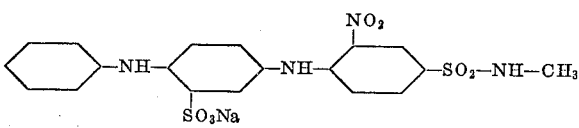

and 0.4 part of the dye of the formula

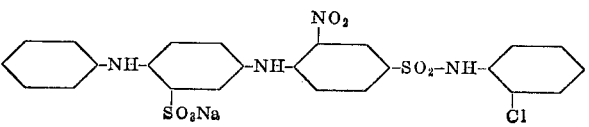

EXAMPLE 7

0.7 part of the dye of the formula

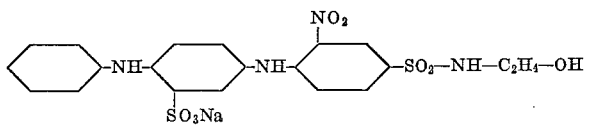

and 0.3 part of the dye of the formula

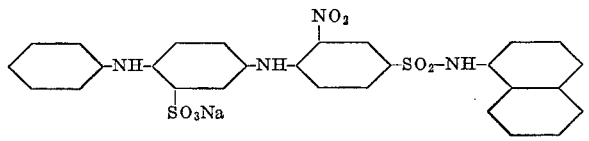

Having thus disclosed the invention, what we claim is:

1. A dye mixture, 10 to 90 percent of which is dye of the formula

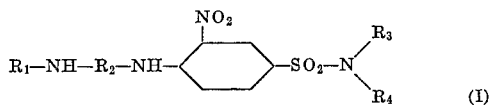

and 90 to 10 percent of which is dye of the formula

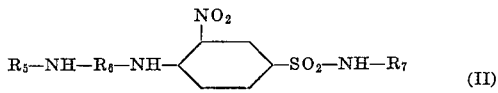

wherein each of $R_1$, $R_2$, $R_5$ and $R_6$ is, independently, a substituted or unsubstituted aromatic radical;

each of $R_3$ and $R_4$ is, independently hydrogen or substituted or unsubstituted lower alkyl, the total number of carbon atoms in $R_3$ and $R_4$ when both are alkyl radicals being not greater than 4;

$R_7$ is substituted or unsubstituted alicyclic, aromatic or heterocyclic radical; and each of dye (I) and dye (II) bears one sulphonic acid group.

2. Dye mixture according to claim 1 wherein $R_7$ of dye (II) is a substituted or unsubstituted alicyclic or aromatic radical.

3. Dye mixture according to claim 1 wherein $R_7$ of dye (II) is cyclohexyl, phenyl, naphthyl or tetrahydronaphthyl.

4. Dye mixture according to claim 1 wherein each of $R_3$ and $R_4$ of dye (I) is a hydrogen atom.

5. Dye mixture according to claim 1 wherein $R_3$ of dye (I) is lower alkyl and $R_4$ of dye (I) is a hydrogen atom.

6. Dye mixture according to claim 1 wherein dye (I) is dye of the formula

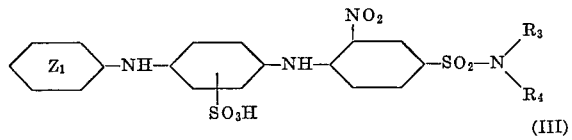

wherein ring $Z_1$ is substituted or unsubstituted, any substituent of substituted ring $Z_1$ being a member selected from the group consisting of methyl, ethyl, methoxy, ethoxy, chloro, bromo and acylamino.

7. Dye mixture according to claim 1 wherein dye (I) is dye of the formula

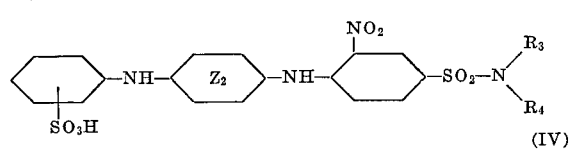

wherein ring $Z_2$ is substituted or unsubstituted, any substituent of substituted ring $Z_2$ being a member selected from the group consisting of methyl, ethyl, methoxy, ethoxy, chloro, bromo and acylamino.

8. Dye mixture according to claim 1 wherein dye (II) is dye of the formula

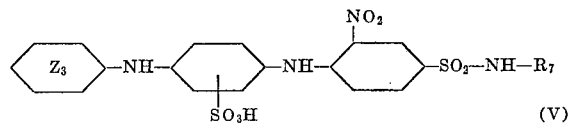

wherein ring $Z_3$ is substituted or unsubstituted, any substituent of substituted ring $Z_3$ being a member selected from the group consisting of methyl, ethyl, methoxy, ethoxy, chloro, bromo and acylamino.

9. Dye mixture according to claim 1 wherein dye (II) is dye of the formula

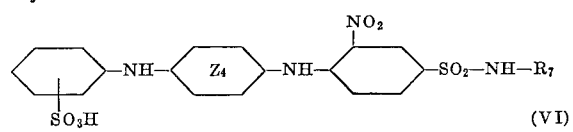

wherein ring $Z_4$ is substituted or unsubstituted, any substituent of a substituted ring $Z_4$ being a member selected from the group consisting of methyl, ethyl, methoxy, ethoxy, chloro, bromo and acylamino.

10. Dye mixture according to claim 1 of from 30 to 70 percent of dye (I) and from 70 to 30 percent of dye (II).

11. Dye mixture according to claim 1 of from 40 to 60 percent of dye (I) and from 60 to 40 percent of dye (II).

12. Dye mixture according to claim 1 of 50 percent of dye (I) and 50 percent of dye (II).

13. Dye mixture of 0.5 part of dye of the formula

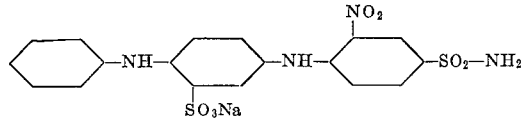

and 0.5 part of dye of the formula

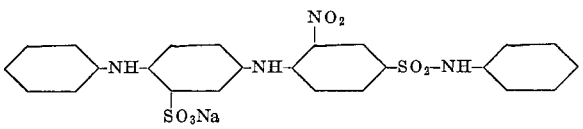

14. Dye mixture of 0.4 part of dye of the formula

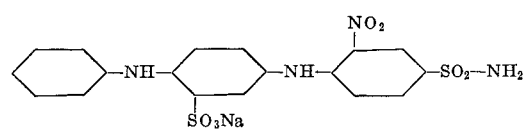

and 0.6 part of dye of the formula

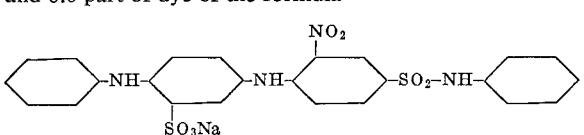

15. Dye mixture of 0.3 part of dye of the formula

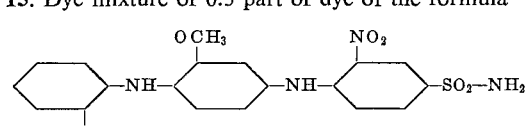

and 0.7 part of dye of the formula

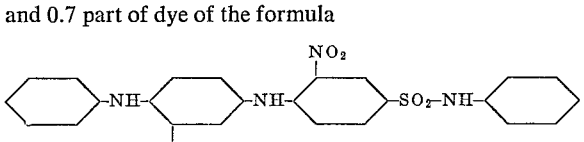

16. Dye mixture of 0.6 part of dye of the formula

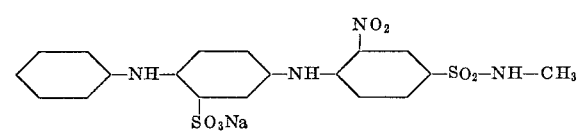

and 0.4 part of dye of the formula

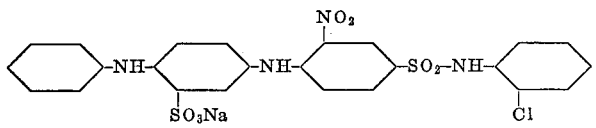

17. Dye mixture of 0.7 part of dye of the formula

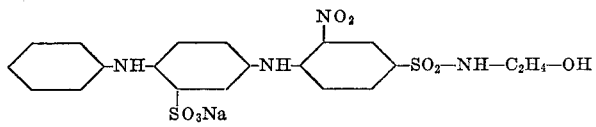

and 0.3 part of dye of the formula

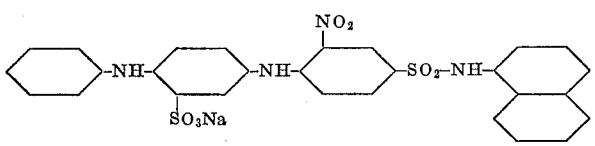

18. A process for dyeing or printing textile fiber consisting of natural polyamide, synthetic polyamide or polyurethane, which process comprises dyeing or printing with a dye mixture according to claim 1.

19. A process according to claim 18 wherein $R_7$ of dye (II) is a substituted or unsubstituted alicyclic or aromatic radical.

20. A process according to claim 18 wherein $R_7$ of dye (II) is cyclohexyl, phenyl, naphthyl or tetrahydronaphthyl.

21. A process according to claim 18 wherein each of $R_3$ and $R_4$ of dye (I) is hydrogen.

22. A process according to claim 18 wherein $R_3$ of dye (I) is lower alkyl and $R_4$ of dye (I) is hydrogen.

23. A process according to claim 18 wherein dye (I) is dye of the formula

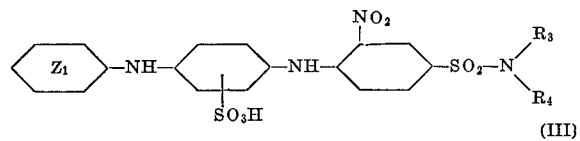

wherein ring $Z_1$ is substituted or unsubstituted, any substituent of substituted ring $Z_1$ being a member selected from the group consisting of methyl, ethyl, methoxy, ethoxy, chloro, bromo and acylamino.

24. A process according to claim 18 wherein dye (I) is of the formula

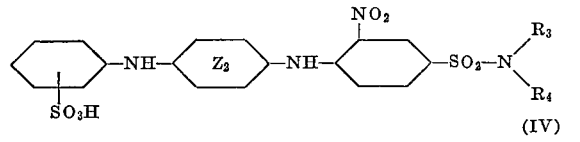

wherein ring $Z_2$ is substituted or unsubstituted, any substituent of substituted ring $Z_2$ being a member selected from the group consisting of methyl, ethyl, methoxy, ethoxy, chloro, bromo and acylamino.

25. A process according to claim 18 wherein dye (II) is of the formula

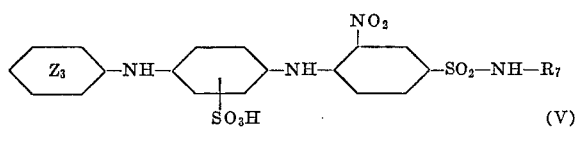

wherein ring $Z_3$ is substituted or unsubstituted, any substituent of substituted ring $Z_3$ being a member selected from the group consisting of methyl, ethyl, methoxy, ethoxy, chloro, bromo and acylamino.

26. A process according to claim 18 wherein dye (II) is of the formula

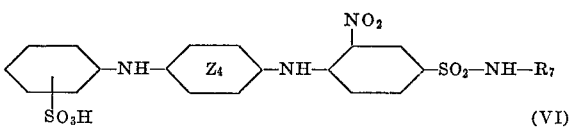

wherein ring $Z_4$ is substituted or unsubstituted, any substituent of substituted ring $Z_4$ being a member selected from the group consisting of methyl, ethyl, methoxy, ethoxy, chloro, bromo and acylamino.

27. A process according to claim 18 wherein the fiber is synthetic polyamide fiber.

28. A process according to claim 18 wherein the mixture is of 30 to 70 percent of dye (I) and 70 to 30 percent of dye (II).

29. A process according to claim 18 wherein the mixture is of 40 to 60 percent of dye (I) and 60 to 40 percent of dye (II).

30. A process according to claim 18 wherein the mixture is of 50 percent of dye (I) and 50 percent of dye (II).

31. A process according to claim 18 which comprises dyeing or printing in aqueous medium.

32. A process according to claim 18 wherein the mixture is of 0.5 part of dye of the formula

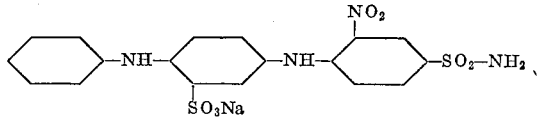

and 0.5 part of dye of the formula

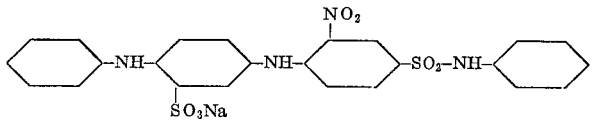

33. A process according to claim 18 wherein the mixture is of 0.4 part of dye of the formula

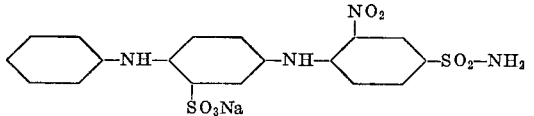

and 0.6 part of dye of the formula

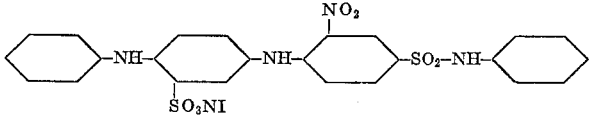

34. A process according to claim 18 wherein the mixture is of 0.3 part of dye of the formula

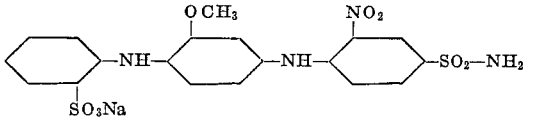

and 0.7 part of dye of the formula

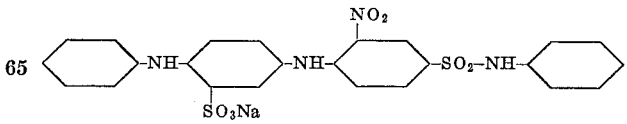

35. A process according to claim 18 wherein the mixture is of 0.6 part of dye of the formula

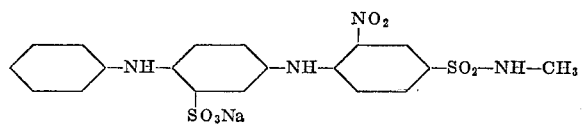

and 0.4 part of dye of the formula
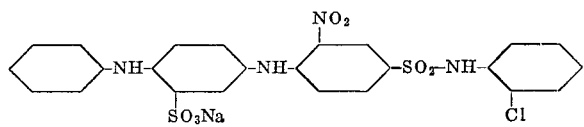
36. A process according to claim 18 wherein the mixture is of 0.7 part of dye of the formula
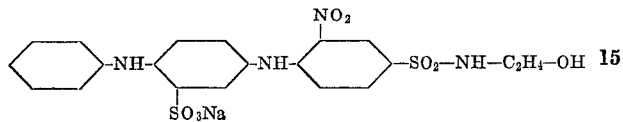
and 0.3 part of dye of the formula
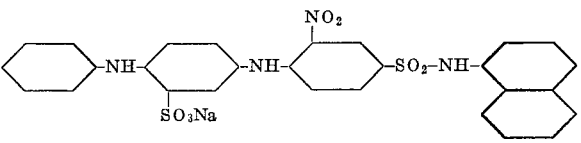
References Cited
UNITED STATES PATENTS
2,080,704  5/1937  Fischer et al. _____ 260—397.7
GEORGE F. LESMES, Primary Examiner
T. J. HERBERT, JR., Assistant Examiner
U.S. Cl. X.R.
8—178; 260—397.7; 8—54

UNITED STATES PATENT OFFICE
CERTIFICATE OF CORRECTION

Patent No. 3,623,832      Dated November 30th, 1971

Inventor(s) DANIEL VAN ASSCHE et al

It is certified that error appears in the above-identified patent and that said Letters Patent are hereby corrected as shown below:

Column 2, line 34, "$\begin{array}{c} R_3 \\ -N \\ \phantom{-}\backslash R \end{array}$" should read -- $\begin{array}{c} R_3 \\ -N \\ \phantom{-}\backslash R_4 \end{array}$ --. Column 3, line 63, in the formula "$\underset{\phantom{x}}{\text{OCH}_3}$ [cyclohexane ring]" should read -- $\underset{\phantom{x}}{\text{OCH}_3}$ [cyclohexane ring] --.

Column 5, line 51, "-$CH_2$-CO-NH"; should read -- -$CH_2$-CO-$NH_2$ --.

Column 7, line 32, "ahighly" should read --a highly--.

Column 12, line 51, in the second formula of claim 33,

" [cyclohexane ring with $SO_3NI$] " should read -- [cyclohexane ring with $SO_3Na$] --

Signed and sealed this 6th day of June 1972.

(SEAL)
Attest:

EDWARD M. FLETCHER, JR.
Attesting Officer

ROBERT GOTTSCHALK
Commissioner of Patents